Figure 1:
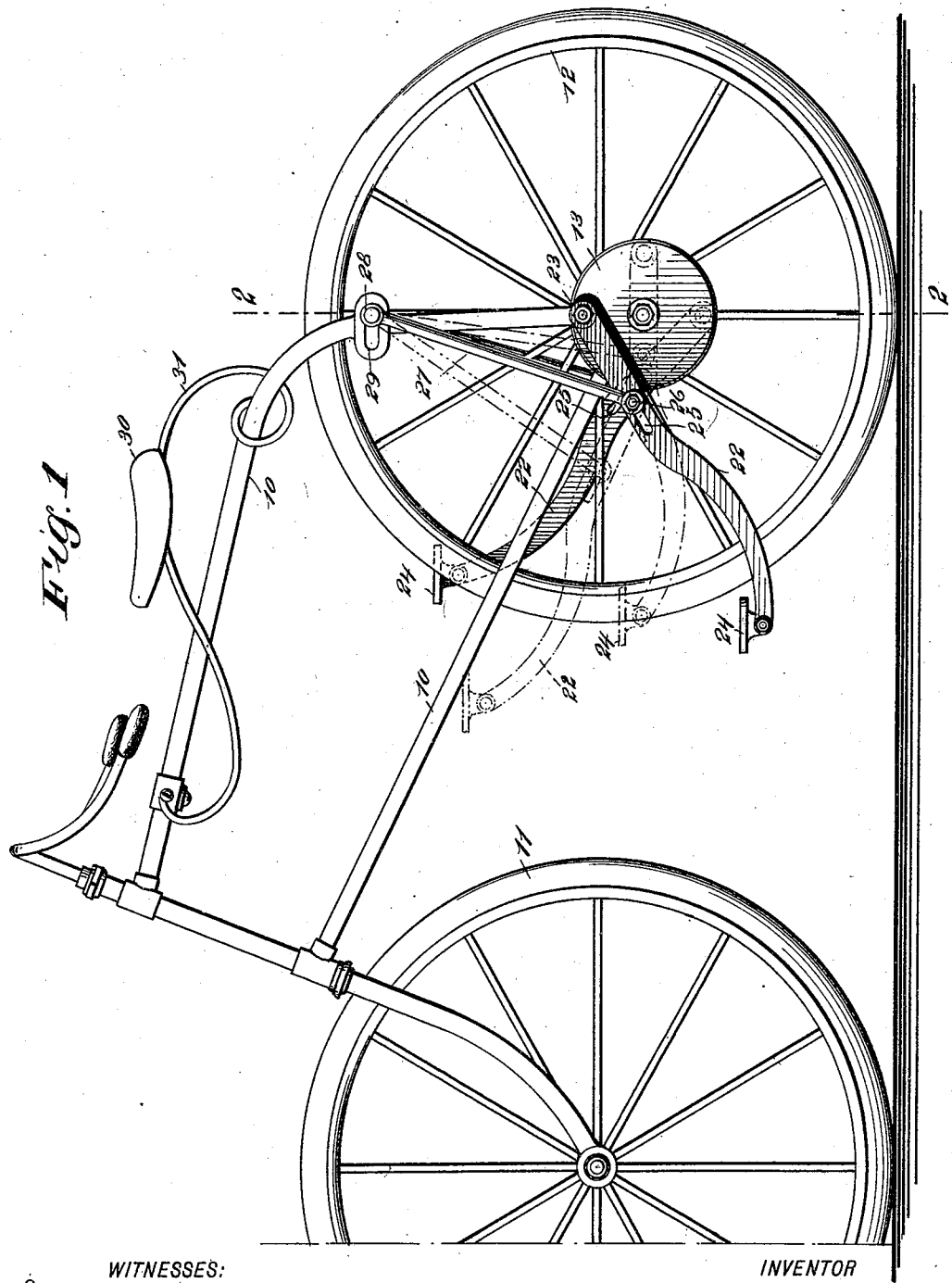

(No Model.)
2 Sheets—Sheet 1.

C. NORDELL.
DRIVING GEAR.

No. 549,005. Patented Oct. 29, 1895.

WITNESSES:
Joshua Bergstrom
W. B. Hutchinson

INVENTOR
C. Nordell
BY
Munn & Co.
ATTORNEYS.

(No Model.) 2 Sheets—Sheet 2.
C. NORDELL.
DRIVING GEAR.
No. 549,005. Patented Oct. 29, 1895.
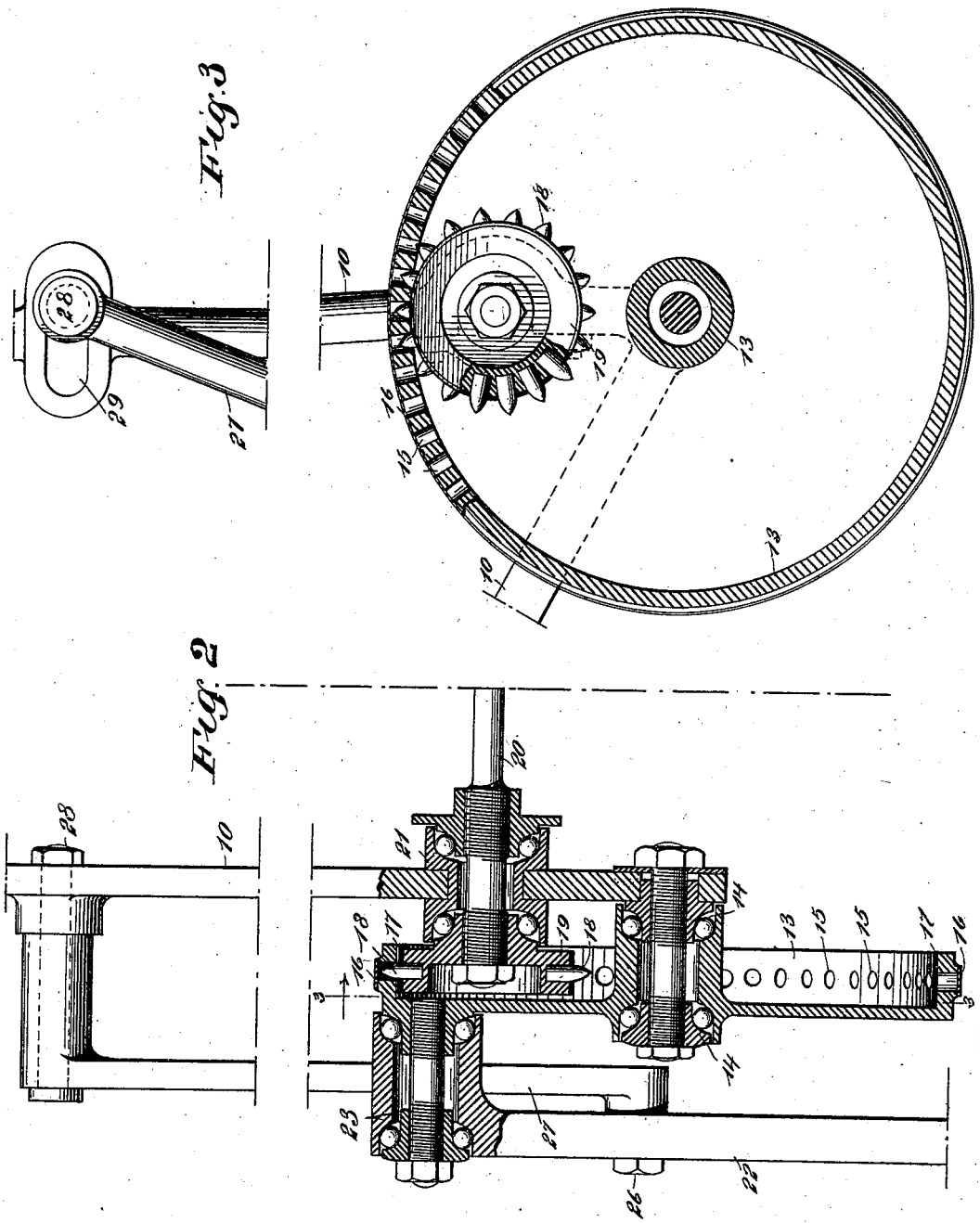
WITNESSES:
Johna Bergstrom
W. B. Hutchinson
INVENTOR
C. Nordell
BY Munn & Co.
ATTORNEYS.

UNITED STATES PATENT OFFICE.

CARL NORDELL, OF STAMFORD, CONNECTICUT.

DRIVING-GEAR.

SPECIFICATION forming part of Letters Patent No. 549,005, dated October 29, 1895.

Application filed December 1, 1894. Serial No. 530,578. (No model.)

*To all whom it may concern:*

Be it known that I, CARL NORDELL, of Stamford, in the county of Fairfield and State of Connecticut, have invented a new and Improved Driving-Gear, of which the following is a full, clear, and exact description.

My invention relates to improvements in pedal-operated driving-gears, and particularly to such gears as are adapted for use in driving bicycles, which application of the driving-gear is illustrated in the accompanying drawings.

The object of my invention is to produce a simple and powerful driving-gear which may be adapted to bicycles of various kinds, which dispenses with the chain and sprocket-wheel usually employed, which drives directly the rear wheel of the bicycle without necessitating the use of a chain of any kind, which is operated by vertically-swinging pedal-levers, which has a shifting fulcrum for the levers, enabling the levers to revolve the wheels with which they are connected by a comparatively small foot-movement, and which, when applied to a bicycle, enables the latter to be driven faster and with greater ease than it can be by the gears usually employed.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of a safety-bicycle provided with my improved driving-gear. Fig. 2 is a broken enlarged detail cross-section on the line 2 2 of Fig. 1, and Fig. 3 is a broken detail vertical section on the line 3 3 of Fig. 2.

The bicycle has the customary frame 10, which may be of any usual shape and make, and which is mounted on wheels 11 and 12 in substantially the usual manner. On opposite sides of the rear wheel 12 are gear-wheels 13, which are journaled on ball-bearings 14, supported on the frame 10, as shown best in Fig. 2, and each gear-wheel has preferably its outer side closed and instead of teeth has holes 15 in its rim. Each wheel 13 has its holes covered on the outer side by a dust-band 16, and each wheel has also on the inner side of its rim a packing-ring 17, preferably of rubber, which deadens the sound occasioned by the contact of the gear-wheel with the pinion which it drives.

Each gear-wheel 13 meshes with a pinion 19, which is secured to the axle 20 of the rear wheel, and the axle turns in ball-bearings 21, which support the rear end of the frame 10. The pinion 19 is preferably made with projecting tapering pins 18, forming its teeth, these pins being adapted to enter the holes 15 of the gear-wheel 13. The forms of gear-wheels and pinions herein described are preferably employed, but it will be seen that any suitable gears and pinions may be substituted without in any way affecting the principle of the invitation.

To each of the wheels 13 is connected a pedal-lever 22, the connection being by means of a ball-bearing 23, (see Fig. 2,) and the lever is connected to the wheel near its periphery, so as to have the necessary power, and the two levers 22 are arranged so that when one is up the other is down, as shown clearly in Fig. 1. The levers have at their forward ends pedals 24, which may be of any approved kind, and each lever is slotted, as shown at 25, so as to have a sliding connection with the pin 26 at the lower end of the hanger-arm 27, which serves as the fulcrum of the foot or pedal lever 22, and which is, at the top, held by a bolt 28 in a slot 29 in the frame 10.

It will be seen that the hanger 27 may be adjusted backward and forward in the slot 29, so as to make it hang parallel and hold the foot-lever higher or lower, as desired, and it will be noticed that when the foot-levers are moved they are alternately depressed and the hanger 27 and pin 26 of each lever serve as its fulcrum, and this fulcrum shifts backward and forward with the turning of the wheel 13, so that by means of this shifting fulcrum the lever 22 has a comparatively small up-and-down movement, and yet acts powerfully on the wheel 13 to turn it.

The machine is provided with a suitable saddle 30, which is supported on a spring 31, and it is not necessary to provide for raising and lowering the saddle, as the difference in the length of the limbs of various riders may be provided for by adjusting the hangers 27 so as to raise or lower the pedal-levers 22.

When the machine is operated, the rider alternately depresses the pedals 24 and levers 22, which levers tilt on their shifting fulcrum-pins 26 and impart a rotary motion to the gear-wheels 13, and so to the rear wheel 12 of the bicycle. No dead-centers occur, because the thrust of the rider is a little backward, preventing the power from being applied on a center line drawn from the pedal 24 to the bearing 23, and, moreover, the levers 22, acting alternately, as they do, prevent such centering.

I have shown the driving-gear applied to a bicycle—a use for which it is chiefly intended; but it will be understood that the driving-gear may be utilized for working other pedal-operated machines if desired.

Having thus described my invention, I claim as new and desire to secure by Letters Patent—

1. The combination with the frame, the gearing, and the pedal levers connected with the said gearing, of a hanger arm adjustably secured on the frame and slidably connected with the pedal lever, as and for the purpose set forth.

2. The combination with the frame, the gearing and the pedal levers connected with said gearing, of a hanger arm secured to the frame and slidably connected with the pedal lever to afford a shifting fulcrum therefor, substantially as described.

3. The combination, with a bicycle, of gear wheels journaled on the bicycle frame on opposite sides of the rear wheel, the gear wheels having inwardly-projecting rims, the pedal levers having a crank connection with the gear wheels, the hanger arms adjustably pivoted on the frame and slidably connected with the pedal levers, and the pinions connected with the rear wheel and geared to the inner sides of the gear wheel rims, substantially as described.

CARL NORDELL.

Witnesses:
WM. T. ANDREWS,
JAS. H. WARNER.